US008620362B2

(12) United States Patent
Goldman et al.

(10) Patent No.: US 8,620,362 B2
(45) Date of Patent: Dec. 31, 2013

(54) METHOD AND APPARATUS FOR SELECTIVE MESSAGE SERVICE BLOCKING

(75) Inventors: Stuart O. Goldman, Scottsdale, AZ (US); Bernard L. Malone, III, Little Rock, AR (US)

(73) Assignee: Alcatel Lucent, Paris (FR)

( * ) Notice: Subject to any disclaimer, the term of this patent is extended or adjusted under 35 U.S.C. 154(b) by 479 days.

(21) Appl. No.: 12/641,874

(22) Filed: Dec. 18, 2009

(65) Prior Publication Data

US 2011/0151896 A1    Jun. 23, 2011

(51) Int. Cl.
*H04W 4/00* (2009.01)
*H04M 3/42* (2006.01)
*H04L 12/28* (2006.01)
*H04J 3/26* (2006.01)

(52) U.S. Cl.
USPC ......... 455/466; 455/414.1; 370/254; 370/432

(58) Field of Classification Search
USPC ........ 455/412.1, 412.2, 413, 414.1, 415–416, 455/433, 440, 445, 466, 502; 709/206; 370/254, 432
See application file for complete search history.

(56) References Cited

U.S. PATENT DOCUMENTS 7,729,710 B2 *  6/2010  Jie et al. ................. 455/466
7,844,674 B2 * 11/2010  Madams et al. ......... 709/206
2003/0023692 A1 *  1/2003  Moroo .................... 709/206
2003/0083078 A1    5/2003  Allison et al.
2005/0186974 A1    8/2005  Cai
2005/0246339 A1 * 11/2005  Kamegaya et al. ......... 707/9
2006/0135136 A1 *  6/2006  Kim et al. ............. 455/414.1
2007/0143422 A1 *  6/2007  Cai ....................... 709/206
2007/0249374 A1   10/2007  Hu et al.
2008/0114884 A1 *  5/2008  Hewes et al. ............. 709/229
2008/0146259 A1    6/2008  Chin et al.
2008/0293389 A1   11/2008  Chin et al.
2011/0212737 A1 *  9/2011  Isidore .................... 455/466

FOREIGN PATENT DOCUMENTS

EP      1 432 255      6/2004
WO    WO 99/27726      6/1999

OTHER PUBLICATIONS

International Search Report dated Mar. 14, 2011.

* cited by examiner

*Primary Examiner* — Inder Mehra
(74) *Attorney, Agent, or Firm* — Fay Sharpe, LLP

(57) ABSTRACT

A method of processing message service requests to a subscriber's communication device in a communication network is provided. The method includes receiving a message service request from a sender at a network element, wherein the message service request includes a message and is directed to the directory number of the communication device; accessing a centralized database that stores message service blocking data for the subscriber; retrieving the message service blocking data for the subscriber; and analyzing the data retrieved from the centralized database and determining whether the message service request should be permitted or denied.

20 Claims, 3 Drawing Sheets

METHOD AND APPARATUS FOR SELECTIVE MESSAGE SERVICE BLOCKING

BACKGROUND OF THE INVENTION

This invention relates generally to wireless telecommunications and, more particularly, to a method and apparatus for allowing subscribers to control the short message service (SMS) access of others to their communication devices. However, it is to be appreciated that the invention is also amenable to other applications. For example, the invention may be implemented for clients with enhanced message service (EMS), multimedia message service (MMS), and other related types of message services.

By way of background, short message service (SMS) is the transmission of short text messages to and from a directory number and/or an Internet protocol (IP) address. It is a store and forward way of transmitting messages to and from mobile phones. The message from the sending mobile phone is stored in a central short message service center (SMSC), which then forwards it to the destination mobile. This means that in the case where the recipient is not available the short message is stored in a database and can be sent later. These characters can be text (alphanumeric) or binary Non-Text Short messages.

Current telecommunication networks provide point-to-point SMS. Typically, SMS is used to transmit messages to and from mobile stations via wireless networks, including personal communication system (PCS), global system for mobile communications (GSM), code division multiple access (CDMA), time division multiple access (TDMA), and paging networks. However, other types of devices capable of transmitting or receiving short messages via other types of networks, such as the public switched telephone network (PSTN), private telephone networks, the Internet, and private intranets and internets, have also been developed.

Person-to-person text messaging is the most commonly used SMS application, and it is what the SMS technology was originally designed for. In these kinds of text messaging applications, a mobile user types an SMS text message using the keypad of their mobile phone, inputs the mobile phone number of the recipient, and then clicks a certain option on the screen, such as "Send" or "OK", to send the text message out. When the recipient mobile phone receives the SMS text message, it will notify the user by alerting such as giving out a sound or vibrating. The user can read the SMS text message some time later or immediately and can send a text message back if so desired.

A popular application of the SMS technology other than person-to-person text messaging is the provision of information to mobile users. Many content providers make use of SMS text messages to send information such as news, weather report and financial data to their subscribers. Reverse billing SMS is a common way used by content providers to bill their users. The user is charged a certain fee for each reverse billing SMS message received. The fee will either be included in the monthly mobile phone bill or be deducted from prepaid card credits.

SMS messages can carry binary data and so SMS can be used as the transport medium of wireless downloads. Objects such as ringtones, wallpapers, pictures and operator logos can be encoded in one or more SMS messages depending on the object's size. Like information services, wireless download services are usually not free and reverse billing SMS is a common way used by content providers to bill their customers. The object to be downloaded is encoded in one or more reverse billing SMS messages. The mobile user who requests the object will be charged a certain fee for each reverse billing SMS message received. If the mobile user is using a monthly mobile phone service plan, the download fee will be included in their next monthly bill. If the mobile user is using a prepaid SIM card, the download fee will be deducted from the prepaid credits.

SMS messaging can be also used as a marketing tool. An example is an SMS newsletter system. After signing up, the user will receive SMS text messages about the latest discounts and products of the company. If the user has any questions or comments, they can send a text message back with the questions or comments in it. The company may include its phone number in the SMS newsletter so that the user can talk to the customer service staff directly if he/she wants to do so.

Thus, SMS has become a convenient way for people to communicate with their friends without invoking a voice call. As SMS becomes more popular, however, uninvited or inappropriate messages may get delivered to SMS subscribers.

The National Do Not Call Registry gives users an opportunity to limit the telemarketing calls they receive. Once they register their phone number, telemarketers covered by the National Do Not Call Registry have up to 31 days from the date of registration to stop calling them. The National Do Not Call Registry is managed by the Federal Trade Commission (FTC), the nation's consumer protection agency. It is enforced by the FTC, the Federal Communications Commission (FCC), and state law enforcement officials.

The National Do Not Call Registry, however, does not cover SMS messages, and there is no equivalent Registry for SMS providers and their subscribers. That is, there is no centralized database operated by the SMS providers that would allow subscribers to update their accounts to indicate that they do not wish to receive SMS messages from specific addresses or from senders without a prior business arrangement.

The present invention contemplates a new and improved method and apparatus that resolve the above-referenced difficulties and others.

SUMMARY OF THE INVENTION

In accordance with an aspect of the present invention, a method of processing message service requests to a subscriber's communication device in a communication network is provided. The method includes receiving a message service request from a sender at a network element, wherein the message service request includes a message and is directed to the directory number of the communication device; accessing a centralized database that stores message service blocking data for the subscriber; retrieving the message service blocking data for the subscriber; and analyzing the data retrieved from the centralized database and determining whether the message service request should be permitted or denied. Optionally, the method may also include: receiving a request from an entity requesting permitted senders directory number data; authorizing the entity to receive permitted senders directory number data; and sending the entity permitted senders directory number data.

In accordance with another aspect of the present invention, an apparatus for processing message service requests to a subscriber's communication device in a communication network is provided. The apparatus includes: receiving means for receiving a message service request from a sender at a network element, wherein the message service request includes a message and is directed to the directory number of the communication device; accessing means for accessing a centralized database that stores message service blocking data for the subscriber; retrieving means for retrieving the message service blocking data for the subscriber; and analyzing means for analyzing the data retrieved from the centralized database and determining whether the message service request should be permitted or denied.

In accordance with yet another aspect of the present invention, a system for processing message service requests to a subscriber's communication device in a communication network is provided. The system includes a centralized database that stores message service blocking data for the subscriber. The system further includes a network element that is operative to: receive a message service request from a sender, wherein the message service request includes a message and is directed to the directory number of the communication device; access the centralized database; retrieve the message service blocking data for the subscriber; and analyze the data retrieved from the centralized database and determine whether the message service request should be permitted or denied.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
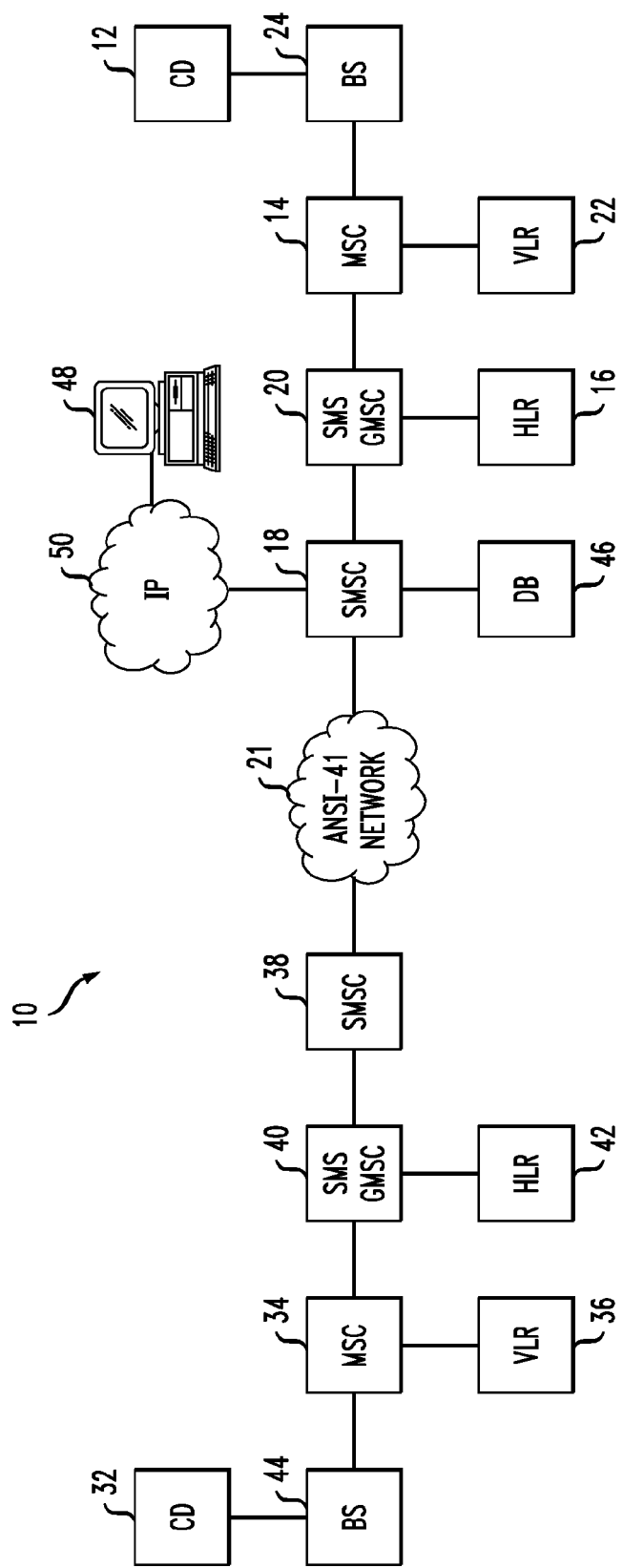
FIG. 1 is a block diagram showing a communication environment suitable for practicing aspects of the present invention.

Referring now to the drawings wherein the showings are for purposes of illustrating the exemplary embodiments only and not for purposes of limiting the claimed subject matter, FIG. 1 provides a view of a communication system 10 into which the presently described exemplary embodiments may be incorporated. The communication system 10 generally incorporates one or more of the well known cellular network technologies, such as WIMAX, UMTS, GPRS, CDMA2000, GSM, CDPD, or 3G and/or wireline technologies (PSTN, PLMN), to transfer data.

A standard known in the art as ANSI-41 (aka TIA/EIA-41 or IS-41) provides roaming services for CDMA systems. It is an example of a Mobile Application Protocol (MAP), which is a high-level protocol that allows major elements of the wireless network to communicate. The major network elements shown in FIG. 1 are described below. The exemplary embodiments will be described with regard to short message service (SMS). However, it is to be appreciated that the invention may be implemented for subscribers with enhanced message service (EMS), multimedia message service (MMS), and other related types of message services.

A first communication device 12 represents the subscriber's communication device and is shown as being in communication with the system 10. The first communication device 12 may be of any type of communication device suitable for receiving and sending short messages, including mobile telephones, handheld computing or digital devices such as personal digital assistants (PDAs), or any other such devices.

The representation of the communication system 10 in FIG. 1 is simplified to minimize its complexity. It should be understood that the communication system 10 may comprise other elements and facilities necessary for the operation of the communication system 10. As used herein, "originating" and "terminating" refers to the endpoints of a call. That is, originating refers to the caller making the call and to the corresponding network elements necessary to make the call, and terminating refers to the person receiving the call and to the corresponding network elements necessary to receive the call.

The first communication device 12 communicates with a first mobile switching center (MSC) 14, which directs communications between the first communication device 12 and various communication channels in the system 10. The first MSC 14 generally routes calls by accessing information in a subscriber database such as a Home Location Register (HLR) 16. The system 10 may include multiple MSCs 14 that are co-located or spaced geographically apart.

The system 10 further includes an entity that performs the jobs of storing and forwarding messages to and from the first communication device 12 such as a first SMSC (Short Message Service Center) 18.

The system 10 also includes a gateway MSC that can also receive message service requests such as a first SMS Gateway MSC (SMS GMSC) 20. The first SMS GMSC 20 is a mobile network's point of contact with ANSI-41 Networks 21. Telephony networks contain many highly computerized elements that need to communicate by sending messages (i.e., signaling). SS7 (Signaling System Number 7) is a digital signaling system that connects the telephony network together. It has largely replaced older, tone-based signaling systems, particularly in the core network. SS7 is ideally suited for transporting ANSI-41 messages. It has the ability to transport messages between any two points on the network. SS7 messages are addressed either by point-code (a unique numeric address assigned to every telephony network) or by global title (use of a telephony-oriented address, such as a calling card number, IMSI or phone number). The point-code roughly corresponds to the IP address on the internet (it even has a subsystem number that corresponds to the port number used by TCP and other higher-level IP protocols) and the global title corresponds to a URL. Most ANSI-41 networks either use the ANSI SS7 network or have a method of directly addressing ANSI point codes.

Upon receiving an SMS message from the first SMSC 18, the first SMS GMSC 20 may use the ANSI SS7 network to interrogate the current position of the first communication device 12 from the first HLR 16.

The first HLR 16 typically contains subscriber/customer profile information, and it may also contain mobility management information, in the case of wireless networks, i.e., the area (covered by a MSC) where the first communication device 12 is currently situated. The first SMS GMSC 20 is thus able to pass on the short message to the correct MSC. The first HLR 16 may also include an Authentication Center (not shown), which contains cryptographic information that allows the network to determine that a mobile station is valid.

A VLR (Visitor Location Register) corresponds to each MSC and contains temporary information about the mobile station, including information such as mobile identification and the cell (or a group of cells) where the mobile station is currently situated. Thus, the system 10 includes a first VLR 22, which is communication with the first MSC 14. Using information from the first VLR 22, the first MSC 14 is able to switch the information (e.g., a text message) to a corresponding first Base Station (BS) 24, which transmits the short message to (or receives the short message from) the first communication device 12. The first BS 24 generally consists of transceivers that send and receive information over the air interface to and from the first communication device 12. This information is passed over the signaling channels so the mobile station can receive messages even if a voice or data call is going on.

Any number of additional communication devices 32 may receive and send short messages. A corresponding set of network components, such as a second MSC 34, a second VLR 36, a second SMSC 38, a second SMS GMSC 40, a second HLR 42, and a second BS 44, enable the additional communication devices 32 to perform these functions as described above.

Preferably, the first SMSC 18 is in communication with a centralized database 46, which stores the SMS blocking rules with respect to the first communication device 12, as described more fully below. The subscriber may communicate with the SMSC 18 via a personal computer (or other suitable device) 48 on an IP network 50 or other suitable network in order to input (set-up and update) the data applicable to the communication device 12 and stored in the centralized database 46

The first operation is for the subscriber to set up the parameters of SMS for the first communication device 12. (Of course, this process may be repeated for additional communication devices as necessary.) Thus, for example, the subscriber may access their account on the SMS provider's Web site or call the SMS provider directly. In this regard, an account arrangement would be established by using one or more of the following types of authentication/authorization mechanisms: user name, account number, and password. In this way, the subscriber's account in the centralized database 46 could only be administered by a valid user. The subscriber then inputs the desired SMS blocking rules and other data that are to be stored in the centralized database 46, which is in communication with the SMSC 18.

The indication that the subscriber does not wish to receive any SMS messages can be addressed in at least two ways. For example, the directory number for the communication device 12 can be entered in a separate list in the centralized database 46, which is then available to businesses to check so that they can delete these numbers from their solicitation mechanism. In addition, it is possible to build a list of directory numbers from which the subscriber is willing to receive SMS messages, while all other directory numbers are automatically blocked.

Thus, in accordance with aspects of the present invention, the following types of data may be entered by the subscriber and stored in the centralized database 46:

the directory number(s) associated with the subscriber's communication device(s)

the subscriber's authentication/authorization information (i.e., username, password, etc.)

whether the subscriber has elected to not receive any SMS messages without a prior business arrangement with the sender (i.e., SMS blocking activation)

the specific directory number(s) from which the subscriber does not wish to receive SMS messages (i.e., barred directory numbers list)

In addition, another type of data may be added to the other data stored in the subscriber's account in the centralized database 46. That is, the directory number(s) to which the subscriber has sent SMS messages may be automatically be added to a "permitted directory numbers" list. In this regard, the subscriber may use the "barred directory numbers" list to block SMS messages from certain businesses, even if the business is the "permitted directory numbers list" (i.e., it operates as an "override" feature).

Of course, it is to be understood that the foregoing is not an exhaustive list of rules and others may be applied and that the above-referenced rules may be referred to by different names yet perform the same general functions.

Figure 2:
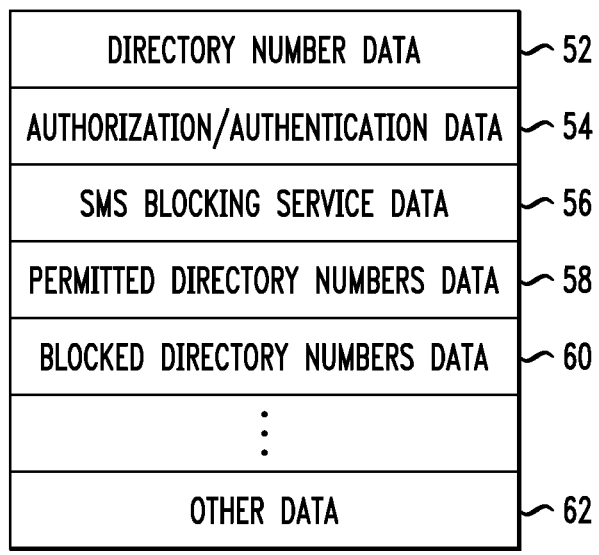
FIG. 2 is a memory layout of data stored in the centralized database in accordance with an aspect of the present invention.

It is to be understood that the centralized database 46 may include any number of data sub-blocks for each subscriber, as illustrated in FIG. 2. They are shown as a super block 50, not all of whose fields are necessarily filled for a particular subscriber. The super block, as known in the art, can be accessed from the identity of any one of several fields in the super block. The super block 50 may thus include the following data sub-blocks: a block 52 containing directory number data for the subscriber; a block 54 containing authorization/authentication data for the subscriber; a block 56 containing data relating to the subscriber's activation of SMS blocking service, e.g., whether or not the subscriber is to receive SMS messages without a prior business arrangement (e.g., an "SMS Blocking" field); a block 58 containing data relating to the specific directory number(s) to which the subscriber has sent SMS messages (e.g., a "Permitted DNs" list); and a block 60 containing data relating to the specific directory number(s) from which the subscriber does not wish to receive SMS messages (e.g., a "Blocked DNs" list). Of course, any number of additional blocks 62 may be provided in the super block 50 for storing other types of subscriber data.

Individual directory numbers entered into the centralized database 46 may be sent to the subscriber's SMS provider. These directory numbers would then be entered into a screening table for that subscriber.

SMS messages directed to the subscriber are to be checked against the entries in the screening table to determine if the originator is on the list. If the originator is on the list, then the SMS provider returns a "rejection" text message to the sender and will not forward the unwanted text message to the subscriber.

Figure 3:
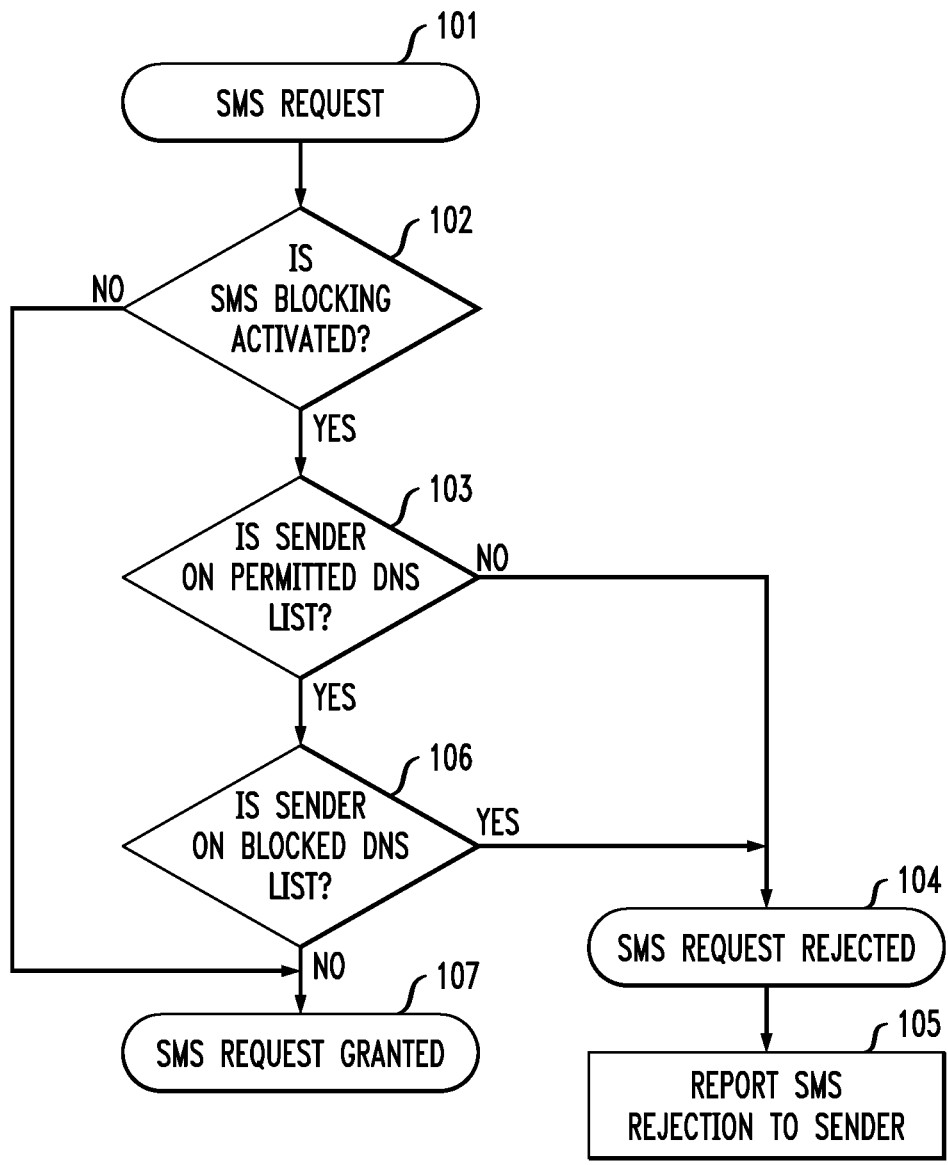
FIG. 3 is a flow chart illustrating an exemplary method of processing SMS text messages in accordance with an aspect of the present invention.

A flow chart outlining an exemplary method of selective SMS blocking is shown in FIG. 3. Initially, an SMS message request for the directory number of the first communication device 12 is received at a network element such as the first SMSC 18 (101). The SMSC 18 then accesses the centralized database 46 to determine whether the subscriber has enabled the SMS blocking feature, which means that the "SMS Blocking" field is set to "Yes" (102). If the "SMS Blocking" field is set to "Yes," then the "Permitted DNs" list will be checked (103).

If the sender's directory number is not in the "Permitted DNs" then the service request will be rejected (104). Optionally, a message may be sent to the sender indicating the SMS message has been rejected (105). In this way, the sender can update their appropriate list by removing the subscriber's directory number.

If the sender's directory number is in the "Permitted DNs" list, then the "Blocked DNs" list will be checked (106). If the sender's directory number is not in the "Permitted DNs" then the service request will be rejected (104). As above, a message may be sent to the sender indicating the SMS message has been rejected (105) so that the sender can update their appropriate list by removing the subscriber's directory number.

If the sender's directory number is not on the "Blocked DNs" list, then the service request will be granted and the SMS message will be sent to the subscriber (107).

Returning to step 101, if the "SMS Blocking" field is set to "No," then service (i.e., the SMS request) will be granted and the SMS message will be sent to the subscriber (107).

It is to be understood that the invention is not limited to SMS, which is a first generation GSM service. Enhanced Messaging Service (EMS), for example, is an extension of SMS that permits messages with special text formatting (i.e., bold or italic), animations, pictures, icons, sound effects, and special ring tones. The service is based on the existing SMS. It basically extends the User Data Header (UDH) in SMS (UDH makes it possible to include binary information in the message header) and in fact needs no upgrade to the network infrastructure. The handsets, however, need to be EMS compliant.

Further, the next step in the evolution of SMS is the Multimedia Messaging Service (MMS), which allows a combination of text, sounds, images and video. MMS supports pictures and interactive video. MMS permits users to send mobile greeting cards and visiting cards. MMS uses standardized protocols like WAP, MExE and SMTP. While EMS requires content reformatting for mobile devices, there is no such requirement for MMS. MMS may run on any bearer service, but practically requires GPRS or 3G bearer services. As opposed to SMS, MMS needs a dedicated channel. It also requires network elements like Multimedia Messaging Relays, MMS Server and MMS User Databases. MMS is being standardized by the 3rd Generation Partnership Project (3GPP).

Some portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to systems for performing the operations herein. These systems may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of processing message service requests to a subscriber's communication device in a communication network, the method comprising:

receiving a message service request from a sender at a network element, wherein the message service request includes a message and is directed to the directory number of the communication device;

accessing a centralized database that stores message service blocking data for the subscriber, wherein the message service blocking data includes permitted sender directory numbers data and blocked sender directory numbers data;

retrieving the message service blocking data for the subscriber;

analyzing the data retrieved from the centralized database and determining whether the message service request should be permitted or denied; and automatically adding a directory number to which the subscriber has sent a message to the permitted sender directory numbers data.

2. The method defined in claim 1, wherein the message service blocking data retrieved from the centralized database includes the following types of data:
- directory number data for the subscriber;
- authorization/authentication information for the subscriber; and
- message service blocking activation data.

3. The method defined in claim 1, further comprising:
- sending a message service rejection notification to the sender when the message service request is denied.

4. The method defined in claim 1, further comprising:
- forwarding the message to the subscriber when the message service request is permitted.

5. The method defined in claim 1, wherein the message service comprises one or more of the following types of message services: short message service (SMS), enhanced message service (EMS), and multimedia message service (MMS).

6. The method defined in claim 1, further comprising:
- receiving a request from an entity requesting permitted senders directory number data;
- authorizing the entity to receive permitted senders directory number data; and
- sending the entity permitted senders directory number data.

7. An apparatus for processing message service requests to a subscriber's communication device in a communication network, the apparatus comprising:
- a receiver that is operative to receive a message service request from a sender at a network element, wherein the message service request includes a message and is directed to the directory number of the communication device;
- a centralized database that stores message service blocking data for the subscriber, wherein the message service blocking data includes permitted sender directory numbers data and blocked sender directory numbers data; and
- at least one processor that is operative to:
- access the centralized database;
- retrieve the message service blocking data for the subscriber;
- analyze the the data retrieved from the centralized database and determining whether the message service request should be permitted or denied;
- automatically add a directory number to which the subscriber has sent a message to the permitted sender directory numbers data.

8. The apparatus defined in claim 7, wherein the message service blocking data retrieved from the centralized database includes the following types of data:
- directory number data for the subscriber;
- authorization/authentication information for the subscriber; and
- message service blocking activation data.

9. The apparatus defined in claim 7, further comprising:
- a transmitter that is operative to send a message service rejection notification to the sender when the message service request is denied.

10. The apparatus defined in claim 7, further comprising:
- a transmitter that is operative to forward the message to the subscriber when the message service request is permitted.

11. The apparatus defined in claim 7, wherein the message service comprises one or more of the following types of message services: short message service (SMS), enhanced message service (EMS), and multimedia message service (MMS).

12. The apparatus defined in claim 7, wherein:
- the receiver is further operative to receive a request from an entity requesting permitted senders directory number data;
- the at least one processor is further operative to authorize the entity to receive permitted senders directory number data; and
- the apparatus further comprises: a transmitter that is operative to send the entity permitted senders directory number data.

13. A system for processing message service requests to a subscriber's communication device in a communication network, the system comprising:
- a centralized database that stores message service blocking data for the subscriber, wherein the message service blocking data includes permitted sender directory numbers data and blocked sender directory numbers data; and
- a network element that is operative to:
- receive a message service request from a sender, wherein the message service request includes a message and is directed to the directory number of the communication device;
- access the centralized database;
- retrieve the message service blocking data for the subscriber;
- analyze the data retrieved from the centralized database and determine whether the message service request should be permitted or denied; and
- automatically add a directory number to which the subscriber has sent a message to the permitted sender directory numbers data.

14. The system defined in claim 13, wherein the message service blocking data stored in the centralized database includes the following types of data:
- directory number data for the subscriber;
- authorization/authentication information for the subscriber; and
- message service blocking activation data.

15. The system defined in claim 13, wherein the network element is further operative to send a message service rejection notification to the sender when the message service request is denied.

16. The system defined in claim 13, wherein the network element is further operative to forward the message to the subscriber when the message service request is permitted.

17. The system defined in claim 13, wherein the message service comprises one or more of the following types of message services: short message service (SMS), enhanced message service (EMS), and multimedia message service (MMS).

18. The system defined in claim 13, wherein the network element is further operative to:
- receive a request from an entity requesting permitted senders directory number data;
- authorize the entity to receive permitted senders directory number data; and
- send the entity permitted senders directory number data.

19. A method of setting up selective message service blocking for a subscriber, the method comprising:
- establishing an account arrangement with the user by using one or more of the following types of authentication/ authorization mechanisms: user name, account number, and password, wherein the subscriber's account in a centralized database can only be administered by a valid user, wherein the followinq types of data are received from the subscriber and stored in the centralized database: one or more directory numbers associated with the subscriber's communication devices; the subscriber's authentication/authorization information; whether the subscriber has elected to not receive any short message service messages without a prior business arrangement with the sender; the specific directory numbers from which the subscriber does not wish to receive short message service message;

receiving from the subscriber one or more short message service blocking rules and storing the short message service blocking rules in the centralized database, which is in communication with a short message service center; and automatically adding a directory number to which the subscriber has sent a message to permitted sender directory numbers data stored in the centralized database.

20. The method of claim 19, wherein the directory number for a communication device of the subscriber is entered in a separate list in the centralized database, wherein the separate list is accessible by other authorized parties to check.

* * * * *